United States Patent
Teoh et al.

(10) Patent No.: US 10,647,131 B2
(45) Date of Patent: May 12, 2020

(54) DENSITY MODULATED AUTO-DUPLEXING

(71) Applicant: Hewlett-Packard Development Company, L.P., Houston, TX (US)

(72) Inventors: Wei Lit Teoh, Singapore (SG); Hua Zhou, Shanghai (CN); Wee Hien Tok, Singapore (SG); Hwee Boon Tan, Singapore (SG); Kok Chai Chong, Singapore (SG)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/085,935

(22) PCT Filed: Jun. 22, 2016

(86) PCT No.: PCT/CN2016/086651
§ 371 (c)(1),
(2) Date: Sep. 17, 2018

(87) PCT Pub. No.: WO2017/219258
PCT Pub. Date: Dec. 28, 2017

(65) Prior Publication Data
US 2019/0105922 A1   Apr. 11, 2019

(51) Int. Cl.
*B41J 3/60* (2006.01)
*B41J 11/00* (2006.01)
(Continued)

(52) U.S. Cl.
CPC ............ *B41J 3/60* (2013.01); *B41J 11/002* (2013.01); *B41J 11/0005* (2013.01);
(Continued)

(58) Field of Classification Search
CPC . B41J 3/60; B41J 11/00; B41J 11/0005; B41J 11/0015; B41J 11/002; B41J 11/0095
See application file for complete search history.

(56) References Cited

U.S. PATENT DOCUMENTS

| 5,414,453 A | 5/1995 | Rhoads et al. |
| 5,608,439 A * | 3/1997 | Arbeiter ............... B41J 2/04551 |
| | | 347/102 |

(Continued)

FOREIGN PATENT DOCUMENTS

| CN | 101992604 | 3/2011 |
| CN | 102103476 | 6/2011 |

(Continued)

OTHER PUBLICATIONS

Xerox, DocuColor 2006, Jan. 26, 2001, http://www.office.xerox.com/latest/DC6BR-01.PDF, 4 pages.

*Primary Examiner* — Jason S Uhlenhake
(74) *Attorney, Agent, or Firm* — HP Inc. Patent Department (57) ABSTRACT

A method for fluid-density modulated auto-duplexing is disclosed. This method determines when a final swath of a printing operation on a surface of a media occurs within a predefined distal end portion of the media. An estimated media dry time after the final swath in the predefined distal end portion is determined to be greater than a predetermined time. The estimated dry time is capped to a predetermined minimum media dry time and a course of action for a feed mechanism is selected to reduce curling and cockling of the media. Furthermore, a non-transitory computer readable medium and a printer having fluid-density modulated auto-duplexing are also disclosed.

15 Claims, 9 Drawing Sheets

(51) Int. Cl.
  *G03G 15/23* (2006.01)
  *G03G 15/00* (2006.01)
  *B65H 9/00* (2006.01)
  *G01J 1/00* (2006.01)

(52) U.S. Cl.
  CPC ........ *B41J 11/0015* (2013.01); *B41J 11/0095* (2013.01); *B65H 9/00* (2013.01); *G01J 1/00* (2013.01); *G03G 15/00* (2013.01); *G03G 15/23* (2013.01); *G03G 15/235* (2013.01); *G03G 15/6576* (2013.01)

(56) References Cited

U.S. PATENT DOCUMENTS

| | | |
|---|---|---|
| 6,337,958 B1 | 1/2002 | Stanich et al. |
| 6,446,555 B1 | 9/2002 | Schramm et al. |
| 6,912,952 B1 | 7/2005 | Landa et al. |
| 2003/0094108 A1 | 5/2003 | Shiki |
| 2006/0238594 A1 | 10/2006 | Tham et al. |
| 2014/0168307 A1* | 6/2014 | Silveston-Keith ..... B41J 11/009 347/16 |
| 2014/0210921 A1 | 7/2014 | Lo et al. |

FOREIGN PATENT DOCUMENTS

| | | |
|---|---|---|
| CN | 102792129 | 11/2012 |
| EP | 0423820 A2 | 4/1991 |
| EP | 0622203 A2 | 2/1994 |

\* cited by examiner

DENSITY MODULATED AUTO-DUPLEXING

BACKGROUND

A traditional printer may include print media paths to move and route print media through the printer, a print engine to print on the print media, and a duplexer to facilitate printing on both sides of the print media. Customer expectations are demanding new printers to provide full duplexing capabilities at lower price points and smaller form factors. Traditional methods of print media routing cannot meet these new cost and form factor requirements.

BRIEF DESCRIPTION OF THE DRAWINGS

This disclosure is better understood with reference to the following drawings. The elements of the drawings are not necessarily to scale relative to each other. Rather, emphasis has instead been placed upon clearly illustrating the claimed subject matter. Furthermore, like reference numerals designate corresponding similar parts through the several views.

DETAILED DESCRIPTION

To allow for smaller form factors and lower cost printers, a new technique has been developed to allow for duplexers with a small turn radius. In traditional printers, duplexers have a large turn radius to allow for easier media movement through the printer to accommodate large discrepancies in media behavior due to large variations of water-based fluids, such as ink, fixers, coatings, and the like, that are applied to printed media. In fact, larger and more expensive printers may have additional components such as dryers and special fixing agents to speed up the evaporation of the water or other solvents in order to keep printing speeds acceptable. By not having these additional components, lower cost printers have traditionally had to either slow down the printer output for every single page, reduce the amount of fluid per page resulting in lighter density printouts, or accept that a higher hard error rate, such as for media jamming, tearing, crinkling, etc. might occur.

This disclosure describes a technique for fluid-density modulated printer control that allows for auto-duplexing of printed media that modifies a printer mechanism sequencing of the printed media based on densitometer readings that determine the wetness of the media and thereby estimate a media dry time in specific locations of the printed media. When it is determined that the media wetness or media dry time in a particular location is beyond a particular threshold, the printer media feed mechanism sequencing is changed to favor a reduction of hard failures (such as media jams) over a slight possibility of an increase in soft failures (such as smearing or smudging by roller marks or printhead contact). By doing so, a smaller duplexer having a smaller turn radius can be implemented to meet the cost and form factor marketing requirements.

In the following description, reference is made to the accompanying drawings which for a part of the description, and which are shown by way of illustration specific examples in which the disclosure may be practiced. In this regard, directional terminology, such as "top", "bottom", "front", "back", "leading", "trailing", etc., is used with reference to the orientation of the Figure(s) being described. Because components of examples of the present disclosure can be positioned in a number of different orientations, the directional terminology is simply used for the purpose of illustration and is in no way limiting of the present disclosure and claimed subject matter. It is to be understood that other examples may be utilized and structural or logical changes may be made without departing from the intended scope of the present disclosure and the accompanying claims.

In one implementation, the firmware of the printer may use a densitometer to track the printed media drying times. "Drying" or "dry" in the context of this disclosure refers to having the fluid placed on the media transition from a "wet" or transferable state on the media to a non-transferable state on the media such that smudging and smearing will not occur. Accordingly, "dry" does not necessarily mean that all of the water or other solvents have completely evaporated or bonded with other compounds in the media but simply that the printed fluid is location stable on the media. From empirical studies, one insight is that merely the wetness of the media in the Bottom of the Form (BOF) region (see 420 in FIG. 4A), that is, the distal end portion, trailing edge, or bottom end of the printed media, affects the proper feeding of the printed media into a duplexer that allows for dual sided printing. Further, an additional insight is that if the printed media can be detected as "too wet" in this BOF region or area, various corrective actions can be taken in the printer's media feed mechanism, via firmware or hardware, to minimize the possibility of a hard failure at the expense of possibly increasing the risk of a soft failure which may be more acceptable to a user than the hard failure.

Figure 1:
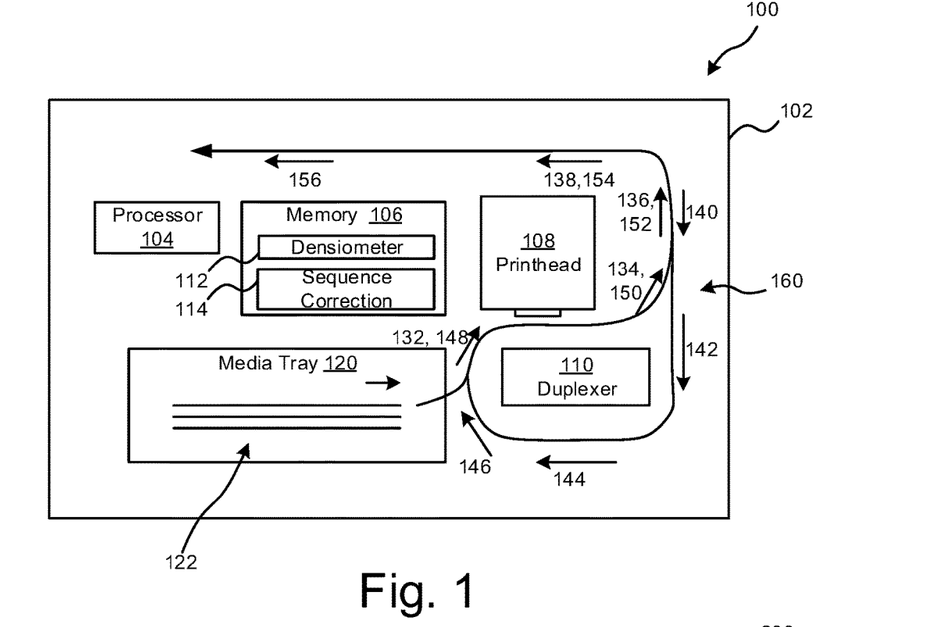
FIG. 1 is an example block diagram of a fluid-density modulated printer mechanism for auto-duplexing of media.

FIG. 1 is an example block diagram of a fluid-density modulated printer mechanism 100 for auto-duplexing of media. Printer 102 includes a media tray 120 holding one or more pages or sheets of media 122. When the printer 102 is commanded to print on the media 122, a media feed mechanism 160 extracts a sheet of media along paths 132, 134, 136 and 138 past a printhead 108. The printhead 108 may be a fluid jet printhead, a continuous fluid printhead, or other printhead for transferring one or more fluids such, as ink or fixer, onto the media. In one example the fluid jet printhead may be a scanning printhead in which a print carriage holds the printhead 108 whilst it traverses the sheet of media 122 in one or more directions. In another example, the fluid jet printhead may be a page wide array printhead which remains stationary.

Printhead 108 may include one or more fluid ejection assemblies, such as a printhead assembly and a fluid supply assembly, such as an ink supply assembly. The printer 102 may include a carriage assembly for transporting the printhead 108 or the printhead 108 may be fixed and the media 122 traversed by the printhead 108. The printhead assembly may include one or more printheads or fluid ejection devices which eject drops of fluid, such as ink, fixers, binders, etc. through a plurality of nozzles or orifices. In one example, the drops are directed toward the media 122 and in other examples, the drops are directed to a transfer mechanism which then places the drops onto the media 122. The media 122 may include any type of suitable sheet material, such as paper, card stock, transparencies, Mylar, fabric, vellum, parchment, and the like. Typically, the nozzles or orifices of the printhead 108 are arranged in one or more columns, rows, or arrays such that properly sequenced ejections of fluid from the nozzles or orifices causes characters, symbols, and/or other graphics and images to be printed upon media 122 as the printhead 108 and the media 122 are moved relative to each other by media feed mechanism 160.

After the media 122 has been printed on by printhead 108 on a first surface, the media 122 is advanced by the media feed mechanism 160 until the trailing edge or distal end portion of the media is at path 136. Rather than wait for the media to "dry" before entering the duplexer 110 as is traditionally done, one new corrective action for the media feed mechanism 160 may be to quickly advance the printed media into the duplexer 110 before cockling of the media can occur. More precise locations of wetness in the BOF region or area to detect the wetness of the left and right corners of the media 122 (see FIG. 4B) may also be used to determine if curling may occur. If so, another corrective action for the media feed mechanism 160 may be to start the printing for the opposite side of the media 122 on the opposing corner. Other corrective actions in the media feed mechanism 160 may be taken in addition or separately as well, such as reducing the deskewing rate of the "wet" media 122 by modifying the deskew count and/or deskew speed, raising the printhead to media spacing, waiting for a period of time in the duplexer, and stretching the media with a tension force and then releasing the tension force after it is "dry". More detail for these additional actions follow in the description below. Then if a dual sided printing is to be performed, the media feed mechanism 160 feeds the media 122 back along paths 140, 142, 144, 146, and 148 until the trailing edge of the media 122 (now the leading edge for the opposite surface) is at the printhead 108 for printing on a second or opposite side of media 122. As the media 122 is further printed on the second side, the media 122 is advanced along paths 150, 152, 154 until printing is complete and then the media 122 is ejected out of the printer 102 along path 156, typically onto a media tray. More detail for these additional actions follow in the description below.

The printer 102 may include a processor 104, having one or more central processing unit (CPU) cores fabricated in one or more integrated circuits and each core may include one or more threads to allow for efficient processing. The processor 104 is coupled to memory 106 to perform operations based on instructions read from memory 106. The instructions in memory 106 may be organized in one or more modules, objects, or sub-routines and is generally under the control of an overall print module (see 914, FIG. 9). The instructions 106 may include a densitometer module 112 and a sequence correction module 114. The densitometer module 112 may be implemented in hardware, software, firmware, or a combination thereof. In one example, the densitometer may include external sensor input for determining the amount of fluid deposited by the printhead 108. In another example, the densitometer may be implemented in firmware or software and include no external sensors. In this example, the amount of fluid deposited by the printhead 108 is monitored by counting the number of drops and flux of fluid ejected into various areas of the printed media 122. In yet other examples, the densitometer may include both external sensors and drop counting in order to get a more precise fluid-density reading. The fluid density may be converted to an amount of "wetness" by tracking also the amount of time from when the fluid has been ejected from printhead 108.

In one example, the densitometer may be a "virtual hourglass densitometer" which for each swath of a printhead determines the amount of time from when the swath was printed. Based on a measured or calculated fluid density for the swath, the virtual hourglass densitometer determines an estimated media dry time (that is, the time required for the printed swath not to smear or smudge) for each swath of the printhead 108. A total time for the media 122 sheet to dry can be determined by taking the max of the estimated media dry time of the last swath or the cumulative estimated dry times of each swath less the elapsed time from the start of printing. During the printing of the media 122, various fluid/media interactions may occur which can affect both the operation of the printer 102 and the print quality of the printed media 122. Accordingly, a database of various media and their properties and various fluids and their properties may be used to help calculate the particular dry time for a specific configuration of media, fluids, and printer properties.

Figure 2:
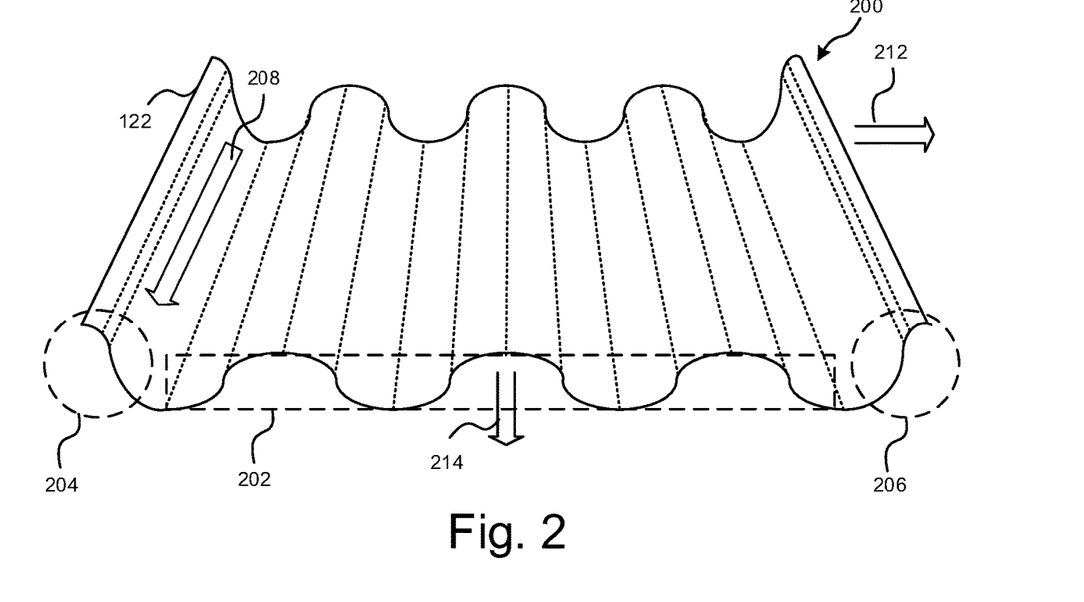
FIG. 2 is an example illustration of a media demonstrating cockling and curling.

FIG. 2 is an example illustration 200 of a media 122 demonstrating cockling 202 and curling 204, 206. In this example, the grain of the media (such as wood, cotton, or other fibers) is shown in direction 208. In some media 122 the grain may be short and perpendicular or normal to the first feed direction 212. This type of media is seen in about 50%-70% of B-sized media. With heavy printing, its performance is weak in the first feed direction 212. For this example, the media can easily bulge upwards in the media feed mechanism 160 causing jams or smears due to feed forces. The right edge curling 206 tends to catch against various resistances along the media path or against a printhead carriage. These impacts often times may cause one or more of either a hard failure in that the media 122 jams or tears, or a soft failure in that the media 122 has smears, smudges, streaks, and the like.

For long grain media 122 where the grain direction 208 is substantially parallel to the second feed direction 214, the media 122 is stiff along the second feed direction 214 and the media 122 does not bulge or catch so easily on the media feed mechanism 160 components. This type of media 122 is seen in about 30%-50% of B-sized media and is the primary type of media 122 used in A-sized sheets. The amount or amplitude of cockle 202 can generally be controlled by having platen ribs (not shown) placed widthwise across the media 122. Such rib control, however, is much less effective for the first feed direction 212 and may also conflict with A-sized media optimization. Accordingly, more than just platen rib control may help further reduce both hard and soft errors.

Figure 3A:
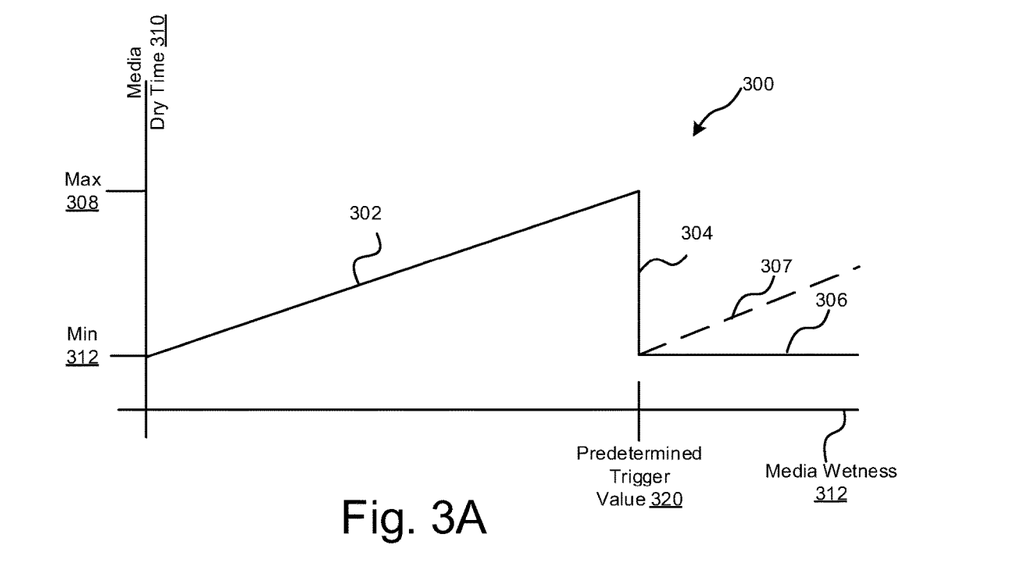
FIG. 3A is an example chart of media dry time vs media wetness for one example of a fluid-density modulated auto-duplexing printer mechanism.

FIG. 3A is an example chart 300 of media dry time 310 vs media wetness 312 for one example fluid-density modulated printer mechanism with a sequence correction module 114. In this example, as the media wetness 312 within the BOF region 420 (FIG. 4A) increases in a first section 302, the media dry time for the printer 102 increases proportionally. In other examples, the increase may be a non-linear proportion, such as a power function, exponential, polynomial, logarithmic, etc. as required by the particular printer and media properties. Once the media wetness 312 in the BOF region 420 reaches a predetermined trigger value 320, then the sequence correction module 114 changes an estimated media dry time to be a minimum media dry time 312 in second section 304. In one example, the minimum media dry time may be between 0 and 1 second, such as 0.5 seconds, and the maximum media dry time is between 4 and 6 seconds such as 5 seconds. This reduction in the estimated media dry time causes the media feed mechanism 160 to speed up sending the printed media 122 to the duplexer 110 before the fluid that had been placed on the media in the BOF region 420 has an opportunity to begin curling 204, 206 or cockling 202 the media 122 and thus prevent a hard error such as a media jam from occurring. Depending on the media type, the maximum dry time 308, the minimum dry time 312, the pre-determined trigger 320, and shape of chart 300 may change as appropriate from characterization or simulation studies. As the media wetness 312 in the BOF region 420 continues to increase beyond the predetermined trigger value 320, sequence correction module 114 may continue to keep the default media dry time at the minimum dry time 312 as shown in third section 307. In another example, the sequence correction module may increase the default media dry time in fourth section 307 in conjunction with increasing media wetness 312 in the BOF region 420 in order to keep the print quality or soft errors from degrading too much due to smearing or smudging of the fluid in the BOF region 420 while it is still wet.

Figure 3B:
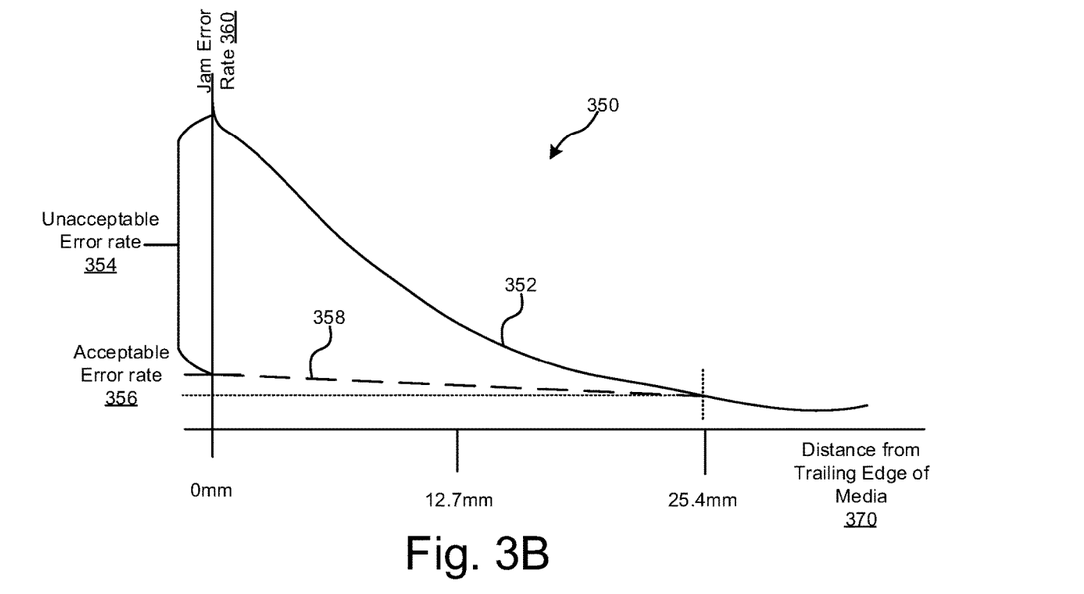
FIG. 3B is an example chart illustrating how a Bottom of Form (BOF) region may be characterized by observing the jam error rate vs distance from trailing edge of media for a heavily printed swath of a printhead.

FIG. 3B is an example chart 350 illustrating how a Bottom of Form (BOF) region (420 in FIG. 4A) may be characterized by observing the jam error rate 360 versus the distance from a trailing edge of media 370 for a heavily printed swath of a printhead 108. In this example, a sheet of media 122 is printed with a heavy amount of fluid on set of sheets from the Top of Form (TOF) or the leading (proximal) edge of the sheet to the distance from the trailing edge of media 370. Accordingly, a non-printed BOF region for each sheet printed is varied in height from the trailing edge of the media 122 as indicated by the distance form trailing edge of media 370 axis. Based on a number of samples, a jam error rate 360 is statistically determined as shown by jam error plot 352. Marketing requirements and/or printer manufacturer quality assurance guidelines will entail an acceptable error rate 356 to be achieved by the printer 102. Without the density modulated auto-duplexing corrections of this disclosure, the printer 102, when duplex printing is desired, may have to not allow printing within the BOF region where there is an unacceptable error rate 354 for hard errors. However, as the chart 350 indicates for this example, printing in the media region above a BOF region that is about 25.4 mm (+/−20% depending on the various media) from the trailing edge or bottom edge of the media 122 results in an acceptable jam or hard error rate. However, heavy printing in the BOF region from slightly below 25.4 mm to the trailing edge of the media 122 may cause an unacceptable hard error rate 354 for media jams and thus by taking one or more of the corrective actions described in the examples below, a corrective jam error plot 358 that maintains an acceptable jam error rate for all printing in the BOF region can be achieved.

Figure 3C:
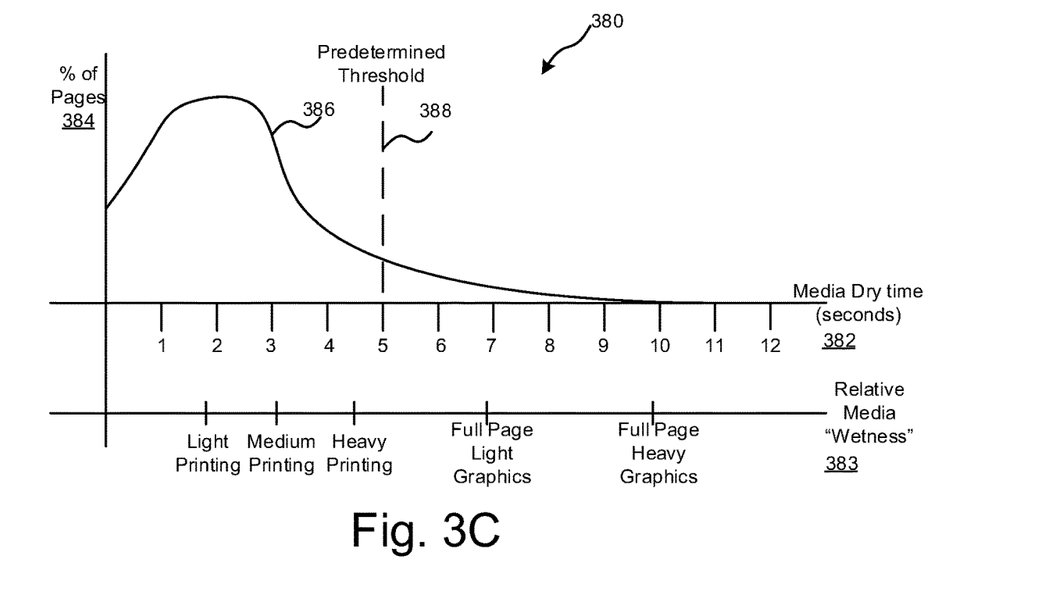
FIG. 3C is an example chart illustrating the percent of plots produced versus the media dry time.

FIG. 3C is an example chart 380 illustrating a graph 386 from statistical analysis and empirical studies of the percent of plots or pages typically produced 384 with a printer 102 versus the media dry time 382 and the corresponding relative media wetness 383 for the pages printed. As shown, the majority of the pages or plots of a printer are done with light printing, such as text output, medium printing, such as text with some graphics, and heavy printing such as text with a large amount of graphics. However, there still are a small percentage of full pages of light graphics and full pages of heavy graphics. The light, medium and heavy printing do not have a lot of fluid placed on the page due to the white space in the text areas and thus the time for the media to dry is typically less than 5 seconds in this one example. Accordingly, a predetermined threshold 388 for a fixed default wait time before entering a duplexer 110 could be set for 5 seconds and most media would be dry and thus less susceptible to hard or soft errors when duplex printing. However, as the chart 380 indicates, there are still a small amount of full page light and heavy graphics being printed which require more than the default wait time of 5 seconds to dry. By using a densitometer to determine the estimated media dry time, the amount of delay before entering the duplexer 110 may be varied and shortened for light and medium type printing. Yet, one cannot wait the full time for a full page with light or heavy graphics to dry as the cockling and curling of the media may be too large for the media feed mechanism 160 in the duplexer 110 as illustrated in FIG. 3D.

Figure 3D:
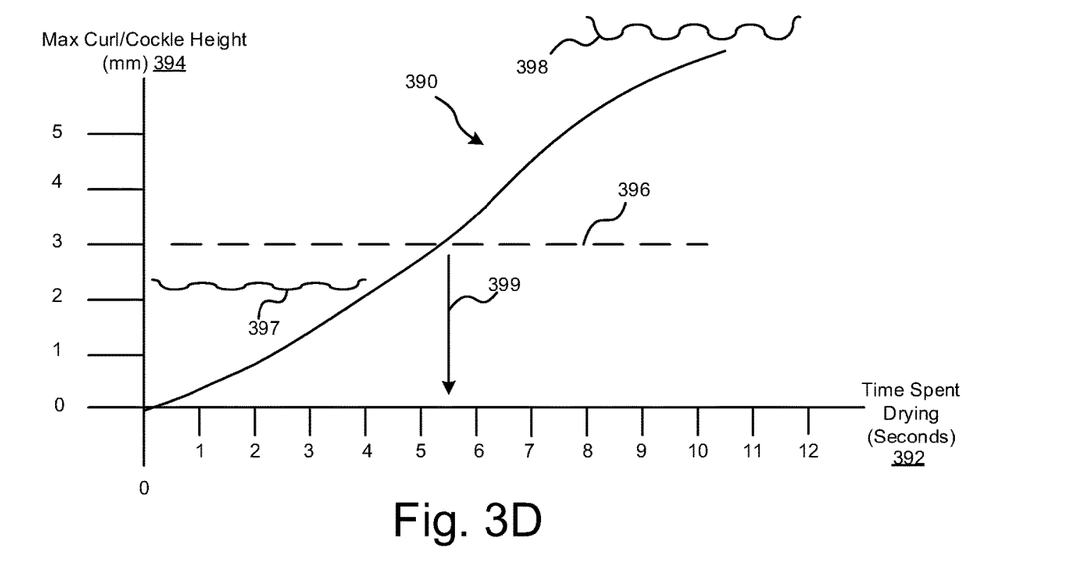
FIG. 3D is an example chart illustrating the growth of curl and cockle over time for a heavily printed page.

FIG. 3D is an example chart 390 illustrating the growth 395 of curl and cockle over time for heavily printed pages such as in FIG. 3C which may require about 10 seconds to dry. The vertical axis represents the amount of maximum curl and cockle height 394 of a page that has been printed with a full page of heavy graphics. The horizontal axis represents the time spent drying 392 from when the printing of the page occurred. First page edge view 397 occurs at about 2 seconds. Second page edge view 398 occurs at about 10 seconds. In one example, a duplexer 110 may have an average of paper path clearance 396 of about 3 mm. Thus as indicated in the chart, by about 2 seconds after the printing has occurred, there is a visible notice in the amount of cockling with a maximum height of about 1 mm media cockle which is within the 3 mm tolerance of the duplexer 110. However, by 5 seconds spent drying, the maximum cockle height for the media has grown to about 3 mm or the limit of the average paper path clearance 396 of the duplexer 110. In this example, the paper path clearance 392 is reached by about 5.5 seconds as indicated by arrow 399. If the media 122 is fed into the duplexer after the 5 second default dry time, the media cockle may continue to grow beyond the 3 mm average paper path clearance 396 and thus may increase the possibility of a hard error, such as jam or tear.

Figure 3E:
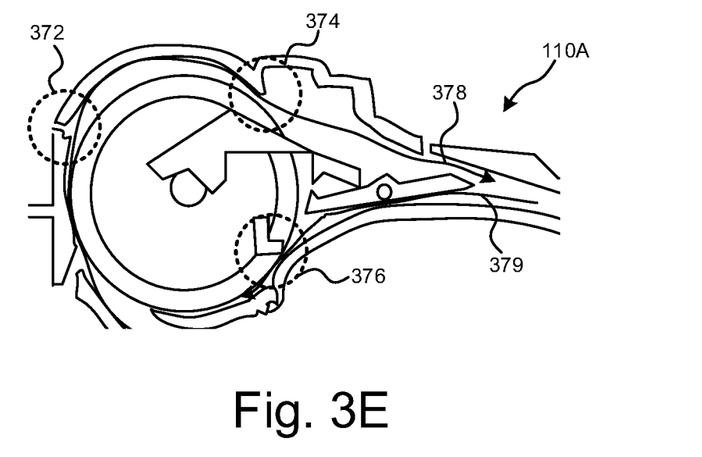
FIG. 3E is a cut-away view of an example low profile duplexer having a small turn radius.

FIG. 3E is a cut-away view of an example low profile duplexer 110A having a small turn radius. While the low profile duplexer 110A may be designed to allow for wider paper path clearance during the loading of the paper into the duplexer 110A such as with first feed direction 378 for printing the first surface of the media 122, there still may be constructions and catches such as 372 and 374 where the media may bind and catch. However, typically the first surface of media 122 prior to printing is usually without cockles and curls as there is no printed matter. It is when after printing the first surface and the media 122 is fed back into the duplexer 110A along second feed direction 379 for printing the second or opposite surface of media 122, the constructions and catches 376 as well as 372 and 374 all have the potential to create a hard error due to the cockle and curls caused by printing to the first surface. As previously noted, one insight is that by controlling the amount of cockling and curling in the BOF region 420 of media 122, the possibility of hard errors, such as jams, may be reduced.

Figure 4A:
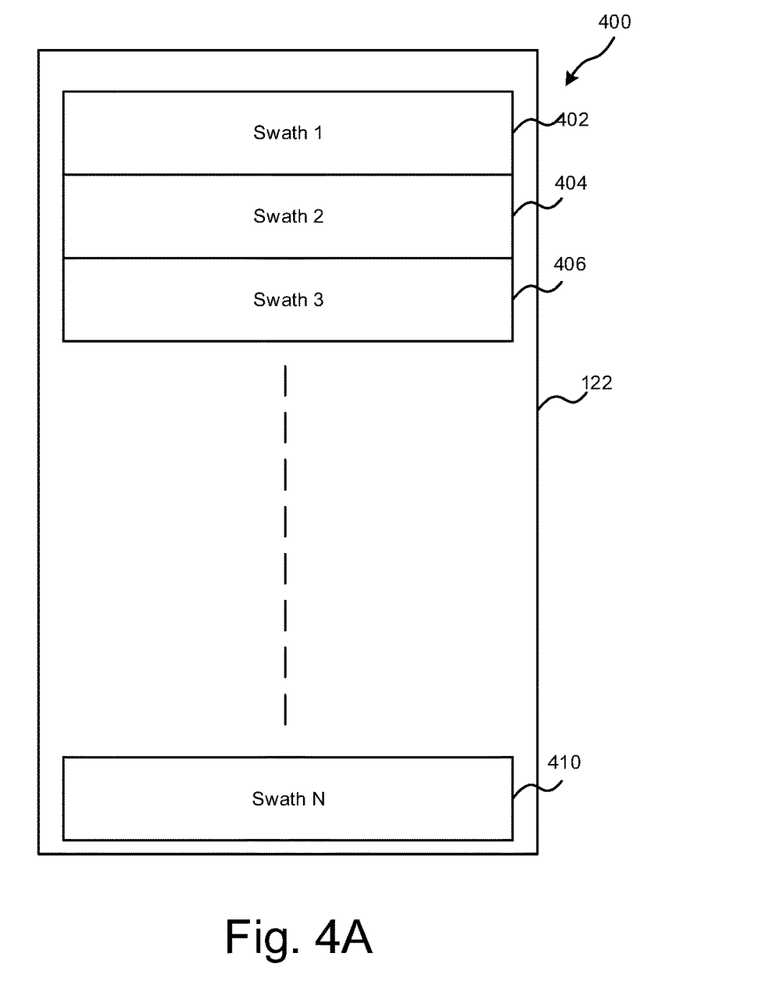
FIG. 4A is an example media layout during printing of multiple swaths of a printhead.

FIG. 4A is an example media layout 400 during printing of multiple swaths 402-410 of a printhead 108 across media 122. A first swath (Swath 1) 402 is followed by a second swath (Swath 2) 404 and a third swath (Swath 3) 406 and more until a final swath (Swath N) 410 completes the printing on the sheet of media 122. The media 122 may include a region at the distal end portion, trailing edge, or bottom of the sheet defined as a "Bottom of Form" or BOF region 420. As discussed, printing in this region may greatly affect the hard error or estimated jam rate of the printed media 122. Monitoring the fluid density in this region and taking appropriate one or more corrective actions when the fluid density meets or exceeds a predetermined limit can reduce or eliminate many hard errors such as media jams.

Figure 4B:
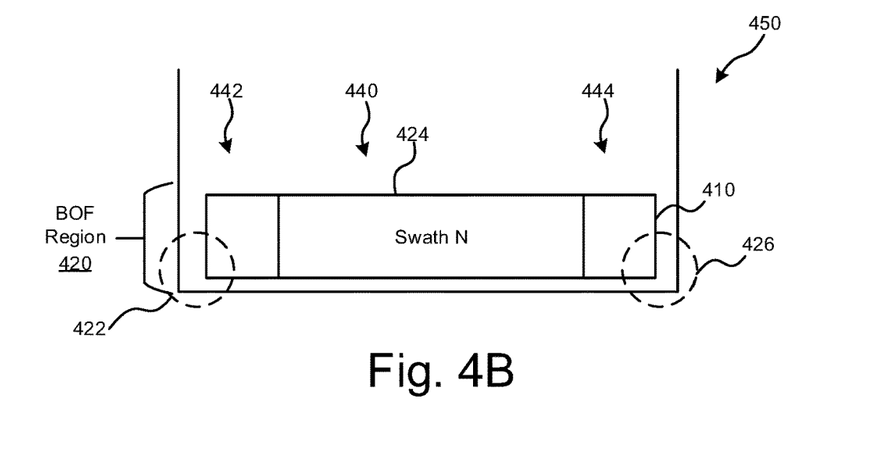
FIG. 4B is an alternative example media layout illustrating multiple regions of fluid-density measurement.

FIG. 4B is an alternative example media layout 450 of media 122 illustrating multiple regions of fluid-density measurement in the final swath 410 (Swath N). In this example, during the final swath 410 or in other examples during printing in the BOF regions 420, a center density measurement 440, a left density measurement 442, and a right density measurement 426 are taken to determine the absolute and relative density differences. For instance, if left density measurement 442 is much greater than the center density measurement 424, then the left corner 422 of the media 122 may curl. Likewise, if the right density measurement 444 is much greater than the center density measurement 440, the right corner 426 of media 122 may curl. In some examples, the center density measurement 440 may be replaced by an average density measurement of the final swath 410. Also, an indirect curling may occur by bowing if the center density measurement 440 is much greater than the left density measurement 442 and the right density measurement 444.

By understanding how the fluid density is distributed across on media 122 and in the BOF region 420 in two dimensional (2D) structures, various geometric time-dependent changes to the media 122 can be predicted and the media feed mechanism 160 operation may be modified by one or more corrective actions without having to slow down printing for every sheet of media 122, reduce the fluid flux (the amount of fluid per area which creates lighter toned images), or ignore quality/reliability issues for high fluid density printed media as is conventionally done.

Figure 5:
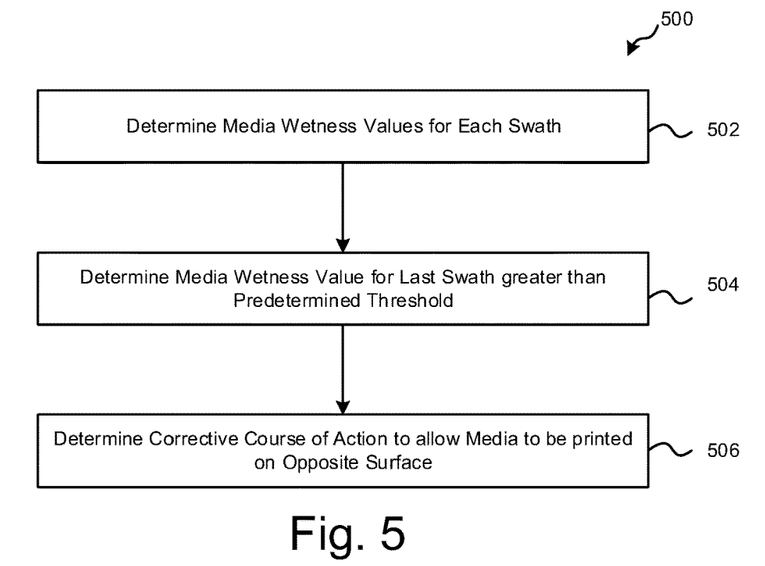
FIG. 5 is an example method of fluid-density modulated auto-duplexing for printed media.

FIG. 5 is an example method 500 of fluid-density modulated auto-duplexing for printed media 122. In block 502 the media wetness values for each swath 402-410 of the printhead 108 is determined. For example, the media wetness values may be based on a densitometer reading and an estimated media dry time estimated for each swath of a printhead 108 onto a surface of the media 122. In one example, the densitometer is a firmware based virtual hourglass densitometer to determine a set of media wetness values by monitoring a current estimated dry time after each swath of the printhead based on the accumulated fluid flux of each drop fired over time less an estimated elapsed time since printing began for the page to create a media dry time. In block 504, the media wetness value for the last swath 410 is determined to be greater than a predetermined threshold. For instance, a media wetness trigger value may be based on an estimated media dry time greater than a predetermined threshold for a swath of the printhead 108 within a predefined distal end portion of the media 122, such as BOF region 420.

In one example, the predefined distal end portion or BOF region 420 is determined (see FIG. 3B) by empirical analysis to be about (+/−20%) 25.4 millimeters from the trailing edge of a length of the surface of the media by a width of the media. In some instances, two local media wetness values at opposing distal corners of the media 122 are determined in the predefined distal end portion of the media 120. Based on the two local media wetness values, the starting position of the firing of a printhead onto the opposite surface at a distal corner having the least local media wetness value on the surface.

In another example, a corrective course of action for the printer mechanism sequencing is to speed up the media advancement position into a duplexer before cockling and curling of the media can occur. In some instances, a check of the media type may be performed first before deciding to speed up the media. For example, if the media is a "Color-Lok"™ branded paper, the time to advance the media to the duplexer may be adjusted to account for the fact that there will be less smearing due to the absorption characteristics and faster drying time of the ColorLok™ branded paper. In some instances, the corrective course of action may also include waiting in a specific area of a duplexer to allow the media 122 to dry and thereby reduce curling and cockling of the media before advancing to the printhead 108. In other instances, the corrective course of action may be to include stretching the media 122 with a tension force created between feed rollers while the media 122 dries and then removing the tension force on the media 122. In yet other examples, a corrective course of action for the printer mechanism sequencing is to reduce at least one of a deskew count and a deskew speed. These reductions give more time for the fluid to dry before printing on the opposite side at printhead 108. Another corrective course of actions can include increasing the printhead to media spacing to allow for greater separation to prevent jams and tears at the expense of lower print quality.

Figure 6:
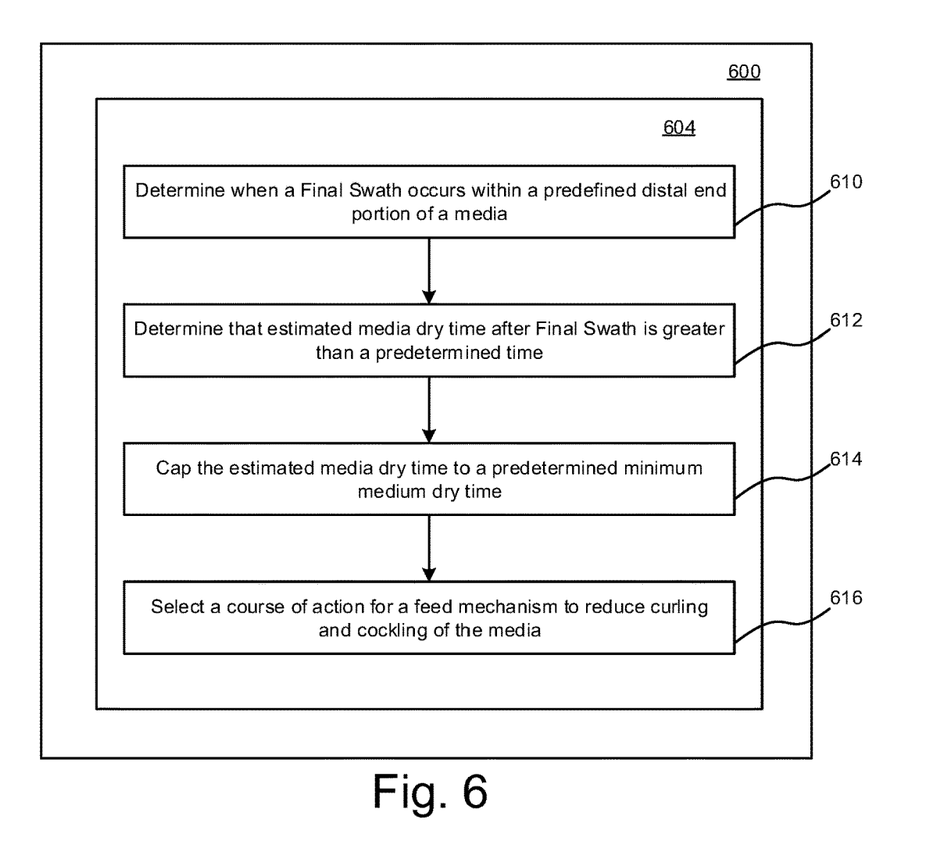
FIG. 6 is a non-transitory computer readable medium with example instructions for fluid-density modulated auto-duplexing of printed media.

FIG. 6 is a tangible non-transitory computer readable medium 600 of physical memory 602 with example instructions 604 for fluid-density modulated auto-duplexing of printed media 122. In this example, the instructions may include one or more modules, subroutines, objects or other programming constructs that when read by the processor and executed cause the processor to perform operations for fluid-density modulated auto-duplexing of media. In block 610, one operation determines when a final swath 410 of a printing operation on a surface of media 122 occurs within a predefined distal end portion or BOF region 420 of the media 122. In block 612, another operation determines that an estimated media dry time after the final swath is greater than a predetermined time and the estimated dry time is then capped to a predetermined minimum media dry time in block 614. In block 616, a course of action is selected for a media feed mechanism 160 to reduce curling and cockling of the media. In one instance, the instructions further allow for waiting for the media 122 to dry before advancing the media 122 and first stretching the media 122 with a tension force created by the feed mechanism while it dries than removing the tension force on the media 122.

Figure 7:
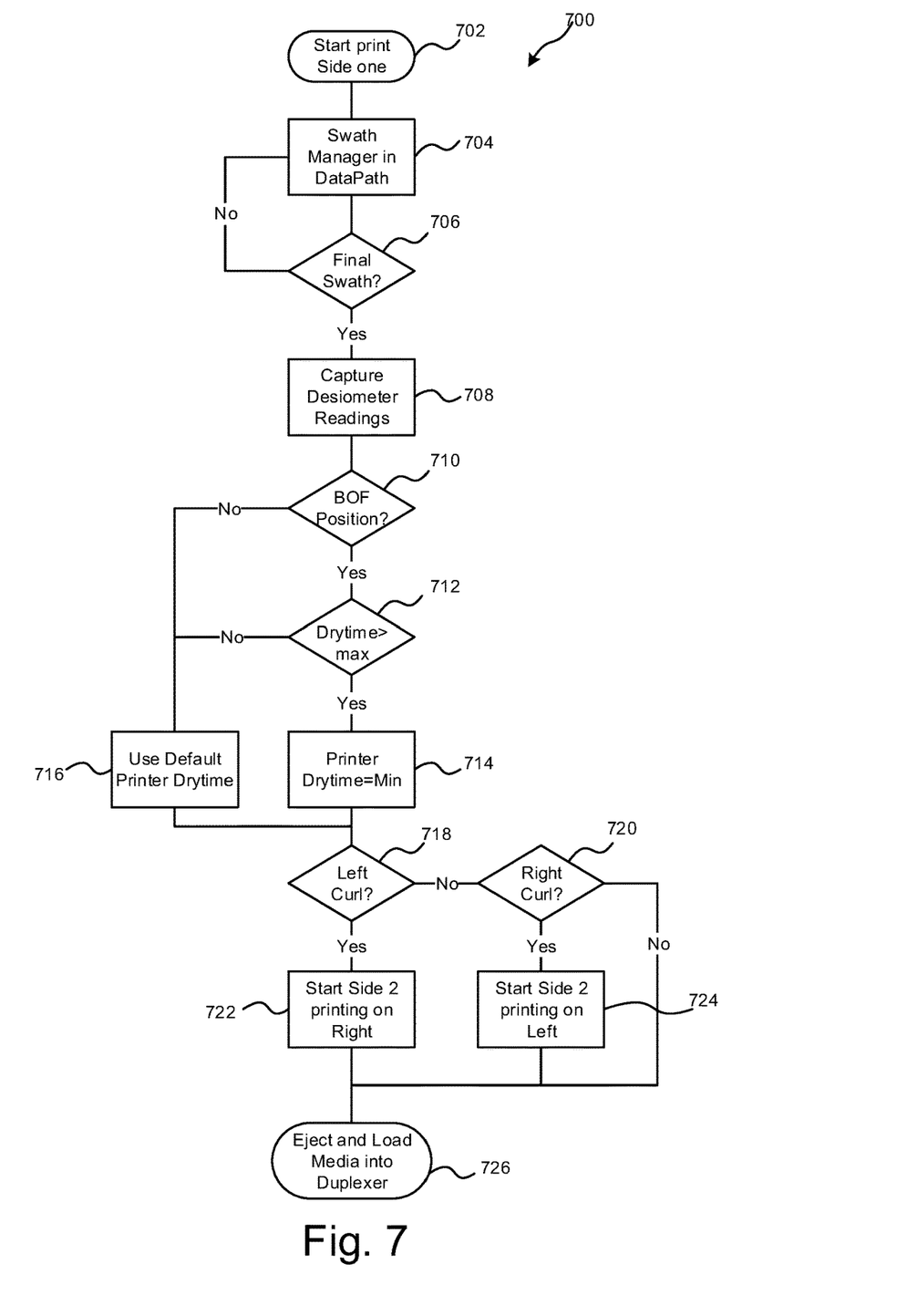
FIG. 7 is a flow chart on an example implementation of fluid-density modulated auto-duplexing.

FIG. 7 is a flow chart 700 on an example implementation of fluid-density modulated auto-duplexing for a printer with limited functionality within the media feed mechanism 160 of the printer. In start block 702 the printer starts printing on side one or a first surface of the media 122. The printer 102 includes a print module (914 in FIG. 9) with a swath manager in the data path in block 709 to transfer the intended image to the media in sets of printhead swaths either by a scanning printhead or a fixed page-wide printhead. In decision block 706, the swath manager determines if a final swath on the first surface has occurred. If not, the swath manager returns to block 704 to continue transferring the image to the surface of the media 122. If the final swath 410 has occurred, the in block 708 the densitometer readings for the full page and the last swath are captured to determine an estimated media dry time and the dry time of the last swath 410. In decision block 710, a check is made to see if the last swath 410 has occurred in the BOF region 420, a predetermined distal end portion of the media 122. If a page is not fully printed or the margins are set wide, the last swath 410 may not occur in the BOF region 420. If not, then a default printer dry time may be used in block 716 to maximize print quality. If the last swath 410 occurred in the BOF region 420 then in decision block 712 a check is made to determine if the estimated dry time of the last swath 410 is greater than a maximum predetermined threshold or trigger value. If not, then the default printer dry time in block 714 may be used. If the trigger value is exceeded then in block 714, the printer dry time is set to a minimum value that balances the hard error risk of media jams and tears against the soft error risk of print quality, such as smudging. In block 718, the localized densitometer readings from the BOF region 410 are examined to see if a possibility of left curl may occur. If so, then in block 722 the printing for side 2, the opposite surface of the media 122, is set to begin printing on the right side of the opposite surface which is the opposite corner of the left curl. If not, then in decision block 720 the localized densitometer readings from the BOF region 410 are examined to see if a possibility of a right curl may occur. If so, then in block 724, the printing for side 2 is set to begin printing on the left side of the opposite surface which is the opposite corner of the right curl. In end block 726, the media 122 is ejected and loaded into the duplexer 110

Figure 8:
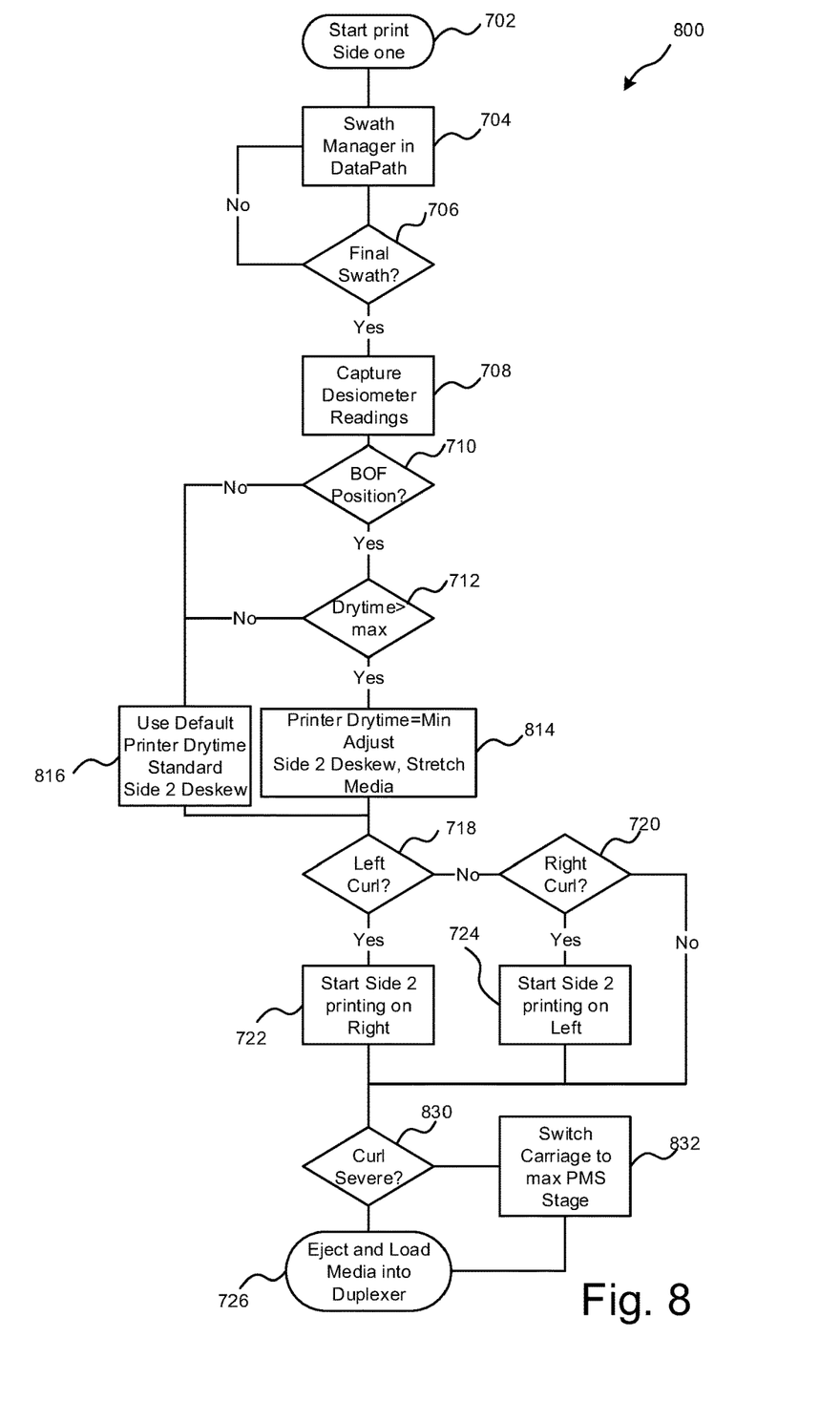
FIG. 8 is a flow chart of an alternative example implementation of fluid-density modulated auto-duplexing.

FIG. 8 is a flow chart 800 of an alternative example implementation of fluid-density modulated auto-duplexing for a printer having more flexible feed mechanism, such as deskew and printhead to media spacing options. Blocks 702-712 follow the same procedure as described in FIG. 7. At block 710, when it is determined that the last swath 410 is not in the BOF region 420 or that the last swath 410 dry time is less than a max predetermined trigger value in block 712, then in block 816, a print module (914, FIG. 9) uses both the default printer dry time and the standard side 2 deskew parameters. However, if the last swath 410 is in the BOF region 420 in decision block 710 and the estimated dry time of the last swath is greater than the max predetermined trigger value in decision block 712, then in block 814 the printer dry time is set to a minimum value that balances the hard error risk of media jams and tears against the soft error risk of print quality, such as smudging, streaking, and smearing as in block 714. However, block 814 may also adjust the side 2 deskew parameters such as reducing the deskew count, the deskew time, adding a wait time in the deskew portion or other location in feed mechanism 160, and/or stretching the media with a tension force during media dry time and the removing the tension force. Blocks 718, 720, 722, and 724 operate as described in FIG. 7. However, before ejecting and loading the media into the duplexer in block 726, a check is made in block 830 to see if either the right curl, the left curl, or a combination of both curls is severe. If so, then the printhead to media spacing (PMS) is set to the max stage to prevent the media 122 from harming the printhead 108 by contact or creating sufficiently lower print quality by having the media smudge or smear the fluid from the printhead 108 onto the media 122.

Figure 9:
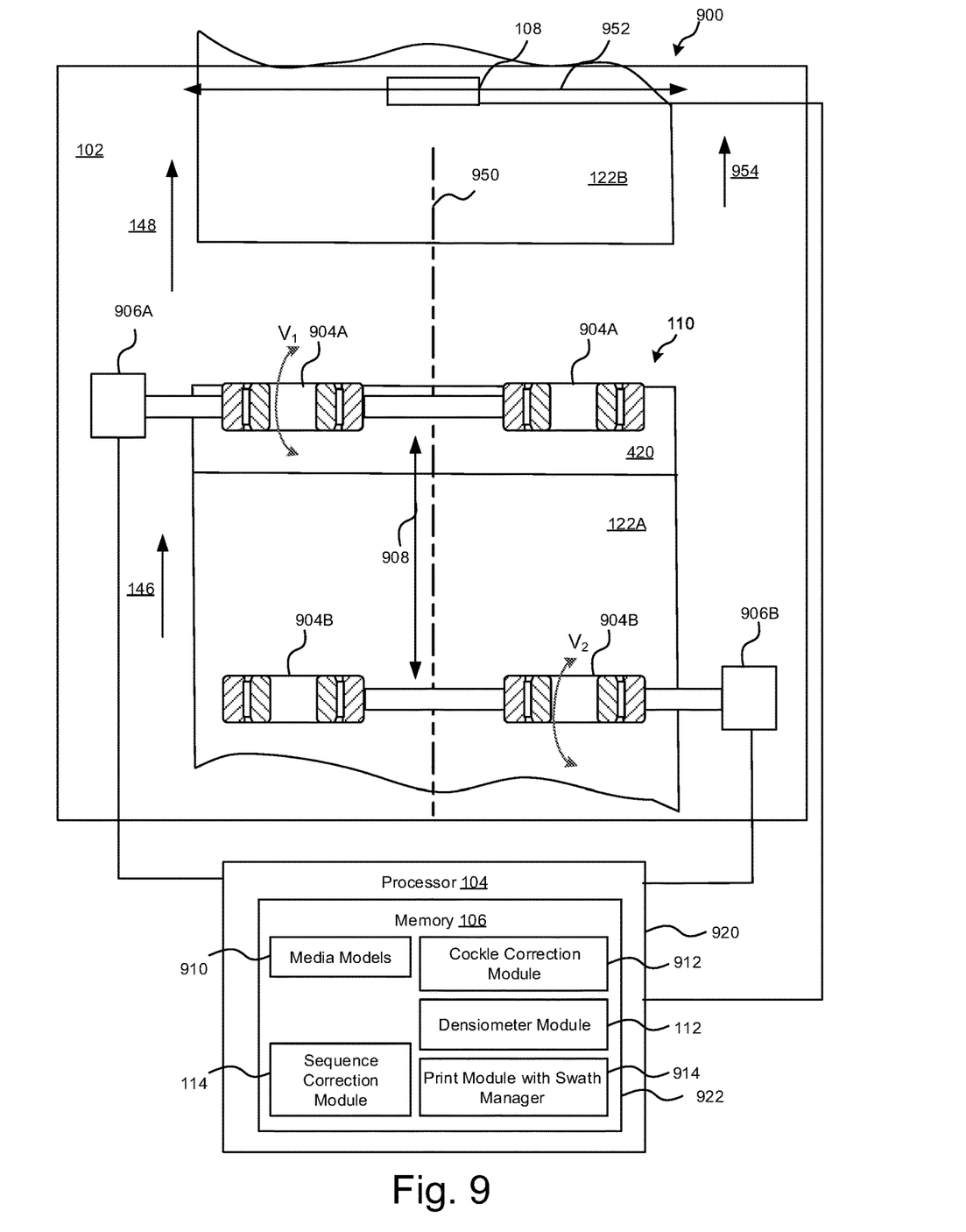
FIG. 9 is a schematic diagram of a duplexer and variable rollers to allow for stretching with a tension force while it dries and then releasing the tension force on the media.

FIG. 9 is a schematic diagram of an alternative fluid-density modulated auto-duplexing printer mechanism 900 showing a portion of a media feed mechanism 160 for an example duplexer 110 having variable rollers, left rollers 904A and right rollers 904B to allow for applying a tension force/removing the tension force on media 122 by use of separately controllable motors 906A and 906B. In this example, printer 102 includes a controller 920 having a processor 104 coupled to tangible, non-transitory memory 106 that includes instructions and data 922 for operating the printer 102. The instructions may include a densitometer module 112 and a sequence correction module 114. The controller 920 also includes a print module 914 with a swath manager and a cockle correction module 912. The data may include a set of media models 910 organized as a table or database of values of various parameters for each media type and size in order to achieve the best performance and print quality tradeoffs for each of the media type and sizes stored in the media models 910. In other examples, there may also be a set of data that includes various fluid models.

The controller 920 is further coupled to a set of independent motors, left motor 906A and right motor 906B (though both could be on the same side in other examples), that are allowed to operate in synchronization or at independent velocities, V1 and V2, for the left and right respectively. The motors 906A and 906B are mechanically coupled to feed rollers 904A and 904B in order to advance the media 122 from a media position 122A in the duplexer 110 to a media position 122B for printing with printhead 108. The variable rollers, 904A and 904B may be located in any portion of the duplexer, ahead of it, or past it but in this example is located between direction 146 and direction 148 from FIG. 1 or just prior to the media feeding into the printhead area. This position allows a printed media to be advanced into the duplexer 110 feed mechanism before the fluid has had a chance to fully cockle or curl the media 112. The BOF region 420 can be stopped at the variable roller 904A and 904B and several corrective actions taken before advancing to the printhead 108.

In this example, the printhead 108 is a scanning printhead that moves in a scan direction 952 transversely or normal to the media feed direction 954 of media advancement. In one instance, the printed media 122 may be allowed to finish drying while the BOF region 420 is stopped at variable rollers 904A. In another instance, cockle correction module 912 operates the variable rollers 904A and 904B to stretch the media 122 with a tension force 908 created by a slight differential velocity between V1 and V2 while it dries and before the media is advanced to the printhead 108 to prevent cockling and/or curling. Once the media 122 has dried, the variable rollers 904A and 904B can be operated to then advance the media towards printhead 108 to allow placement of fluid on the backside of media 122. In other examples, the media 122 may have a tension force applied to it while it traverses between variable roller 904A and 904B within media position 122A. The tension force 908 may be restricted based on the media type from media models 910 to limit the amount of tension force 908 exerted on the media 122 to prevent tearing due some types of media 122 having weakened strength due to the wetness of the media material.

In summary, by taking one or more corrective actions when a media has been detected has having been heavily printed in the BOF region, cockling and curling of the media can be addressed for media that is to be duplex printed. By taking these actions, a lower cost printer with a smaller form factor may be produced as the media feed mechanism can be made smaller as a duplexer mechanics does not need to take into account worse case conditions of media deformation to prevent media jams. The performance of the printer may be improved by reducing the amount of time needed to make duplex prints.

While the claimed subject matter has been particularly shown and described with reference to the foregoing examples, those skilled in the art will understand that many variations may be made therein without departing from the intended scope of subject matter in the claims which follow. This description should be understood to include all novel and non-obvious combinations of elements described herein, and claims may be presented in this or a later application to any novel and non-obvious combination of these elements. The foregoing examples are illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements.

What is claimed is:

1. A method for fluid-density modulated auto-duplexing, comprising:
   determining a set of media wetness values based on a densitometer reading to calculate an estimated media dry time for each swath of a printhead onto a surface of a media;
   determining a media wetness trigger value based on the estimated media dry time greater than a predetermined threshold for a swath of the printhead nozzle within a predefined distal end portion of the media; and
   determining a corrective course of action for a printer mechanism sequencing based on at least the media wetness trigger value to allow the media to be printed on an opposite surface.

2. The method of claim 1 wherein the predefined distal end of the media is an area encompassing about 25.4 millimeters from the trailing edge of a length of the surface of the media by a width of the media.

3. The method of claim 1 further comprising determining two local media wetness values at opposing distal corners of the media in the predefined distal end portion of the media.

4. The method of claim 3 further comprising determining the starting position of the firing of a printhead onto the opposite surface at a distal corner having the least local media wetness value on the surface.

5. The method of claim 1 wherein the corrective course of action for the printer mechanism sequencing is to speed up the media into a duplexer before cockling and curling to the media exceeds a mechanical tolerance of the duplexer.

6. The method of claim 5 wherein the corrective course of action includes to wait in a specific area of a duplexer allow the media to dry and thereby reduce curling and cockling of the media.

7. The method of claim 5 wherein the corrective course of action includes stretching the media with a tension force while the media dries and then releasing the tension force on the media.

8. The method of claim 1 wherein the corrective course of action is to adjust at least one of a deskew count and a deskew speed.

9. A non-transitory computer readable medium (CRM) comprising instructions for fluid-density modulated auto-duplexing that when executed on a processor cause the processor to:
   determine when a final swath of a printing operation on a surface of a media occurs within a predefined distal end portion of the media;
   determine that an estimated media dry time after the final swath in the predefined distal end portion is greater than a predetermined time and cap the estimated dry time to a predetermined minimum media dry time; and
   select a course of action for a feed mechanism to reduce curling and cockling of the media.

10. The non-transitory CRM of claim 9 further comprising instructions to eject and load the media into a duplexer upon expiration of the minimum media dry time to speed up the media into the duplexer before the cockling and curling to the media can occur.

11. The non-transitory CRM of claim 10 further comprising instructions to include at least one of to wait for the media to dry before advancing the media and to stretch the media with a tension force while the media dries and then release the tension force on the media.

12. The non-transitory CRM of claim 9 further comprising instructions to:
   determine a left corner media dry time and a right corner media dry time of the final swath; and
   start the first swath for the media on an opposite surface of the media at a corner having a lessor media dry time than an opposite corner.

13. A printer having fluid-density modulated auto-duplexing, comprising:
   a printhead;
   a feed mechanism coupled to the printhead and a duplexer;
   a processor coupled to the printhead and the feed mechanism; and
   a memory coupled to the processor and including instructions to cause the processor to control the printhead and the feed mechanism to print in swaths on a surface of a media, including:
      a densitometer module to determine media wetness and an estimated media dry time of a last swath at a distal end portion of the media; and
      a sequence correction module to determine that the last swath is within the predefined distal end portion of the media, that the media wetness is greater than a trigger value, and to select a course of action for the feed mechanism to reduce curling and cockling of the media.

14. The printer of claim 13, wherein the densitometer module includes instructions to determine two local media wetness values at opposing distal corners of the media in the predefined distal end portion of the media and to determine a starting position of the printhead when the media is fed back to the duplexer to be printed on an opposite surface.

15. The printer of claim 13, wherein the sequence correction module feeds the media to the duplexer within a minimum dry time if the media wetness is greater than the trigger value.

* * * * *